Nov. 29, 1927.
N. W. RAPHAEL
TRANSMISSION CHOCK
Filed April 28, 1926
1,651,227
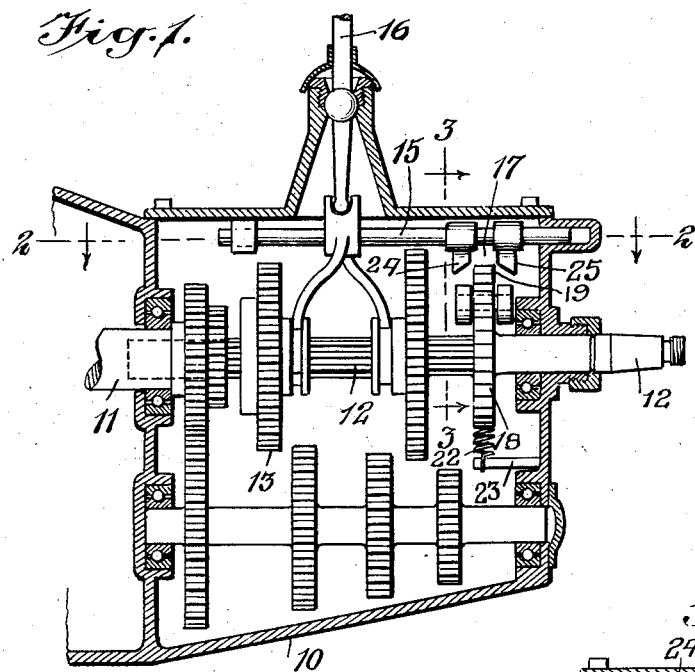
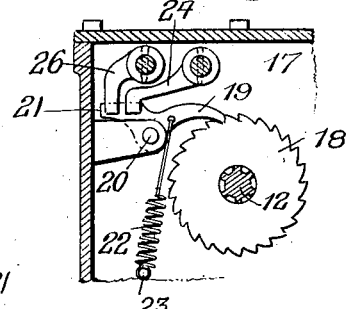
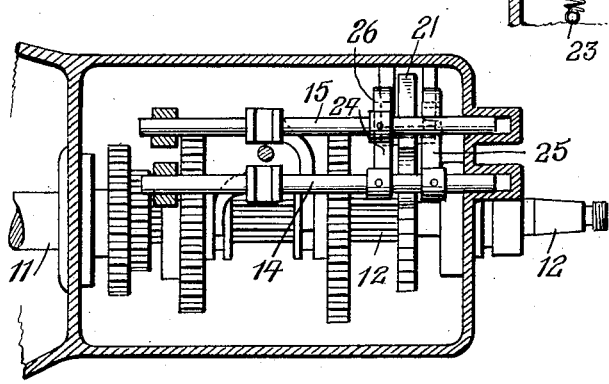
WITNESSES
INVENTOR
Nathaniel W. Raphael
BY
-ATTORNEYS Patented Nov. 29, 1927.

1,651,227

UNITED STATES PATENT OFFICE.

NATHANIEL W. RAPHAEL, OF SOUTH ORANGE, NEW JERSEY.

TRANSMISSION CHOCK.

Application filed April 28, 1926. Serial No. 105,281.

This invention relates to mechanism for controlling the action of a transmission mechanism or gear set such as is used in connection with an automobile engine.

In driving an automobile, it has been found that the automobile when at a standstill on an incline moves backward, as the brakes are released preparatory to the letting-in of the clutch and the operation of the gear shift lever to again start the car in motion.

It is therefore one of the objects of the present invention to prevent any accidental backward movement of an automobile, and especially when the same is on an incline.

Another object of the invention is to combine with the transmission mechanism of an automobile power system, a chocking mechanism with which the drive shaft of the transmission mechanism may be optionally permitted to rotate in one direction only, or with which the drive shaft may be permitted to rotate in both directions, so that intentional backward movement may be had whenever it is desired, for instance for intentionally backing the automobile.

Another object of the invention is to provide an extremely simple and reliable chocking mechanism which will operate in response to movements of the usual sliding gear shift rods of a power transmission mechanism.

With the foregoing, other objects of the invention will appear from the embodiment of the invention which by way of example is described in the following specification and illustrated in the accompanying drawings, in which—

Figure 1 is a sectional elevation of a power transmission mechanism embodying the present invention.

Fig. 2 is a sectional view taken on the line 2—2 of Fig. 1.

Fig. 3 is a detail sectional view taken on the line 3—3 of Fig. 1.

The present invention is intended for use in conjunction with a power transmission mechanism such as is included in the power system of an automobile.

In the illustrated embodiment there is shown a power transmission or gear set 10 of well known construction and which includes an engine shaft 11, a drive shaft 12 to which power is transmitted by virtue of the intervention of a set of gears 13, shifting rods 14 and 15 which are slidably mounted and operate in conjunction with the usual gear shift lever 16 and connected parts for obtaining the proper rotational speed of the drive shaft and its reverse rotation.

Employed in conjunction with the power transmission 10, briefly outlined hereinbefore, is the chocking mechanism 17 of the present invention, and this mechanism operates in response to movements of the shifting rods 14 for optionally permitting the drive shaft 12 to rotate in one direction only and thereby prevent rotation of the shaft which would result in the automobile moving backward, or permitting said shaft to rotate in both directions so that the necessary and intentional backward movement as well as forward movement of the automobile may be brought about. By arranging the said mechanism 17 so as to operate in conjunction with the shifting rods, an extremely simple and reliable mechanism may be obtained. It is to be understood that this mechanism may be diversely formulated, but in the present instance includes a ratchet wheel 18 which is secured to the drive shaft 12 and a pawl 19 which coacts with the teeth of the ratchet wheel 18. The pawl 19 is pivotally mounted as at 20, and the said pawl has an extension or cam engaged portion 21. The pawl normally coacts with the teeth of the ratchet and this may be brought about in different ways such as by having the portion of the pawl at the ratchet side of the pivot heavier than that portion of the pawl at the opposite side, or as in the present instance there may be employed a spring 22 having one end fixedly attached to a part of the gear case as at 23 and its opposite end connected with the pawl 19 at the ratchet wheel side of the pivot. It will now be apparent that the spring serves to normally and constantly urge the pawl in a coacting relationship with respect to the ratchet wheel 18. Arranged on the shift rod 14 are cams 24 and 25, and arranged on the shift rod 15 is a cam 26. When the gear shifting lever 16 is manipulated to obtain high speed the cam 25 will be moved into engagement with the extension 21 and as a result the pawl 19 will be moved against the action of the spring 22 to an inactive position, whereas when the lever 16 is manipulated to obtain intermediate or second speed the cam 24 will be moved into engagement with the extension 21 causing a similar movement of the pawl 19, and when the lever 16 is manipulated for reversing a similar movement of the pawl 19 will result. These facts are mentioned to make it clear that each time the lever 16 is manipulated for obtaining either high, and second speeds and reverse rotation of the drive shaft, the pawl 19 will be out of engagement with the ratchet wheel. When the lever 16 is in a neutral position the pawl 19 will be in an active position so as to coact with the teeth of the ratchet wheel 18, due to the fact that the spring 22 will automatically operate to accomplish this. It follows therefore that accidental backward movement of the automobile will be prevented since the drive shaft will be prevented from rotating except in a direction which would cause the forward travel of the automobile. In the present instance the pawl 19 will remain in an active position when the gears for obtaining first or low speed are in meshing engagement, but this is negligible since low speed is seldom used for any great length of time.

I claim:

1. The combination with a transmission mechanism including a drive shaft and shifting rods; of chocking mechanism operable in response to the movement of said shifting rods for optionally permitting the drive shaft to rotate in one direction only or permitting said shaft to rotate in both directions.

2. The combination with a transmission mechanism including a drive shaft and shifting rods; of chocking mechanism operable in response to the movement of said shifting rods for optionally permitting the drive shaft to rotate in one direction only or permitting said shaft to rotate in both directions, said chocking mechanism including coacting means associated with the shifting rods and the drive shaft.

3. The combination with a transmission mechanism including a drive shaft and shifting rods; of chocking mechanism operable in response to the movement of said shifting rods for optionally permitting the drive shaft to rotate in one direction only or permitting said shaft to rotate in both directions, said chocking mechanism including coacting means associated with the shifting rods and the drive shaft, said coacting means including an element secured to the drive shaft.

4. The combination with a transmission mechanism including a drive shaft and shifting rods; of chocking mechanism operable in response to the movement of said shifting rods for optionally permitting the drive shaft to rotate in one direction only or permitting said shaft to rotate in both directions, said chocking mechanism comprising pivotally mounted means, means on the shifting rods which coacts with the pivotally mounted means, an element on the drive shaft with which said pivotally mounted means is engageable and disengageable, and means acting on the pivotally mounted means to releasably hold said pivotally mounted means in engagement with said element.

5. The combination with a transmission mechanism including a drive shaft and shifting rods; of chocking mechanism operable in response to the movement of said shifting rods for optionally permitting the drive shaft to rotate in one drection only or permitting said shaft to rotate in both directions, said chocking mechanism comprising a ratchet wheel secured to the drive shaft, a pawl which coacts with the ratchet wheel, said pawl having an extension, cams secured respectively to the shifting rods which coact with said extension for moving the pawl to an inactive position, and means which has a normal tendency to cause the pawl to coact with said ratchet wheel.

NATHANIEL W. RAPHAEL.